United States Patent [19]

Corrado

[11] Patent Number: 4,746,209

[45] Date of Patent: May 24, 1988

[54] DEVICE FOR STORING AND HANDLING SLIDES

[75] Inventor: Ettore Corrado, Brebbia, Italy

[73] Assignee: European Atomic Energy Community (EURATOM), Luxembourg

[21] Appl. No.: 22,896

[22] Filed: Mar. 6, 1987

[30] Foreign Application Priority Data

Mar. 6, 1986 [LU] Luxembourg .................. 86348

[51] Int. Cl.$^4$ ............................................ G03B 23/08
[52] U.S. Cl. ................................. 353/25; 353/103; 353/118
[58] Field of Search ............... 353/25, 26 R, 26 A, 353/27 R, 27 A, 118, 117, 103, 94, 107

[56] References Cited

U.S. PATENT DOCUMENTS

| | | |
|---|---|---|
| 1,215,975 | 2/1917 | Palmer .............................. 353/110 X |
| 4,273,427 | 6/1981 | Bailey . |
| 4,353,642 | 10/1982 | Weigert ............................. 353/25 R |
| 4,487,487 | 12/1984 | Burbank, III . |
| 4,568,161 | 2/1986 | DiGianfilippo et al. . |

FOREIGN PATENT DOCUMENTS

| | | |
|---|---|---|
| 0034014 | 8/1981 | European Pat. Off. . |
| 928578 | 6/1947 | France ................................ 353/25 |
| 91735 | 11/1978 | Japan ................................. 353/25 |

Primary Examiner—Harry N. Haroian
Attorney, Agent, or Firm—Sughrue, Mion, Zinn, Macpeak, and Seas

[57] ABSTRACT

The invention relates to a device for storing and handling slides for their selective projection. The device comprises at least one storage rack (6) for slides, and means for displacing (18, 27) the racks under the control of a data processing machine (3), so that any selected slide (31) may appear in front of an extraction window (7). According to the invention, a plurality of circular storing racks (6) are stacked according to a common vertical axis, and the means for displacing the unit of racks comprise a reversible motor (27) permitting a vertical displacement of the unit of racks, and a motor (18) permitting a rotation of the unit of racks about the axis of said shaft. The data processing machine controls the extraction and the reinsertion of a slide in accordance with a memorized sequence selected previously by the user and with the instantaneous position of the unit of racks.

6 Claims, 1 Drawing Sheet

U.S. Patent May 24, 1988 4,746,209
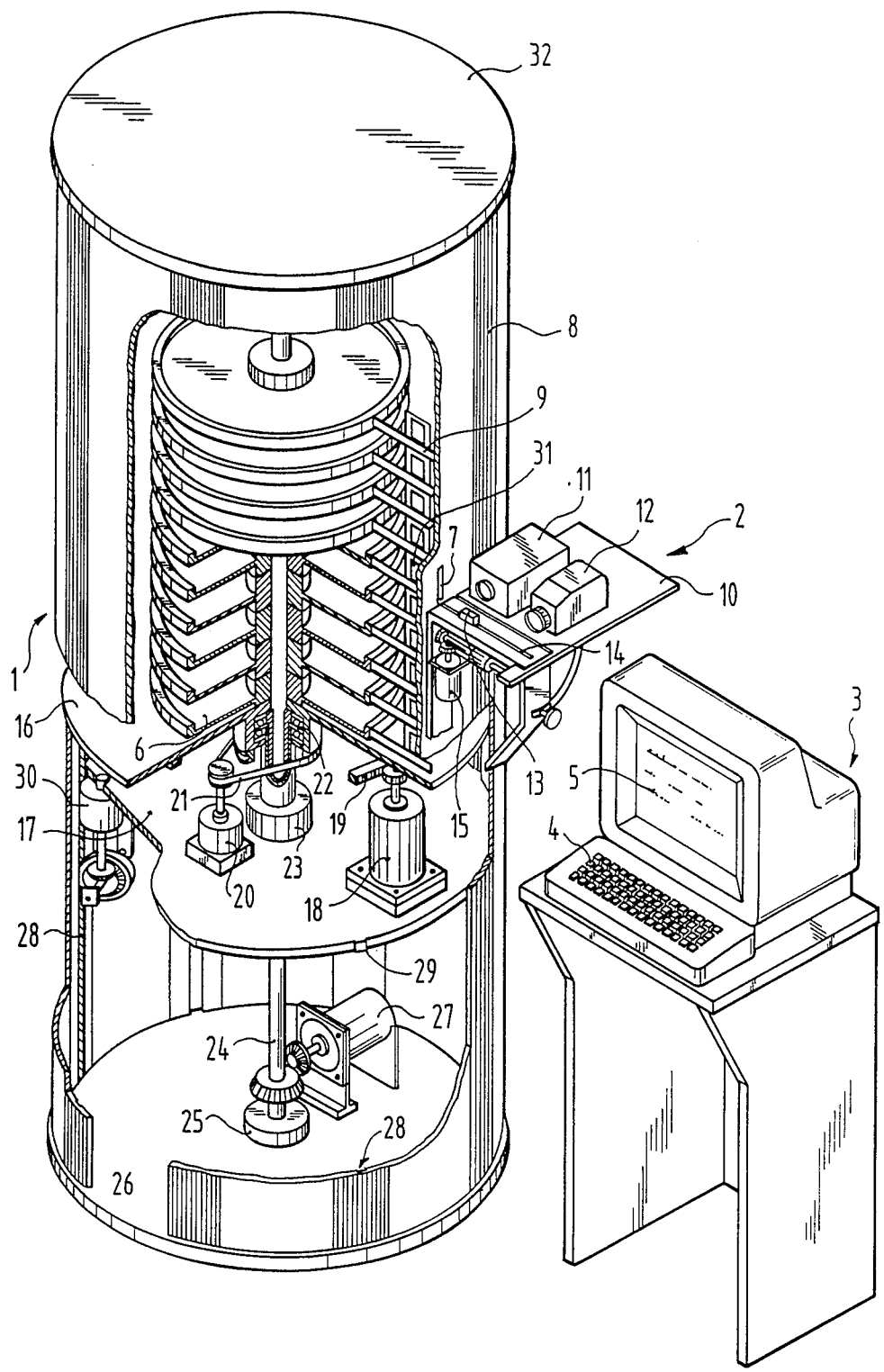

DEVICE FOR STORING AND HANDLING SLIDES

FIELD OF THE INVENTION

The invention refers to a device for storing and handling slides for their selective projection, comprising at least a storage rack for slides, means for displacing the racks under the control of a data processing machine, so that any selected slide may appear in front of an extraction window, means for extracting the selected slide towards at least one display position or vice-versa, and a projection unit permitting the extracted slide to be displayed on a screen.

BACKGROUND OF THE INVENTION

Slides are generally stored in racks which can be inserted into a projector for their display. When a conference is prepared, the slides which are convenient for the conference in question are chosen amongst the available slides and they are arranged in a rack. There are linear racks, in which the slides are orientated all in the same way, and circular racks, in which the slides are arranged according to circle radii.

For scientific, training or advertisement conferences, such slide storing devices present certain disadvantages.

A first disadvantage consists in the fact that the slides are handled manually by the speaker when he selects the slides for a conference among the slides at his disposition. Thus, he risks to arrange them badly when returning them after the conference, which affects the repertory of the slides store. Furthermore, the capacity of the classic stacks is limited which often makes an exchange of racks necessary during the course of a conference. This is an operation which disturbs the audience and which necessitates a manual interference of the speaker or his assistant.

SUMMARY OF THE INVENTION

The invention thus intends to eliminate these disadvantages and to propose a device such as indicated above, which presents a storing capacity which is considerably higher than that of the known racks and which avoids any manual selection of slides during the preparation of a conference and any filing error after the conference.

This aim is achieved by the device for storing and handling slides as it is characterized in claim 1. Due to the great number of racks which are stacked in the device according to the invention, up to 4000 slides can be stored therein and can be selected according to a preestablished sequence which is memorized in the data processing machine. Without any manual handling of the slides, a plurality of different slide sequences can thus be memorized in the data processing machine on the basis of the same slides, these sequences being at the disposition of the speakers.

Due to the measures according to claim 2, the data processing machine knows at any moment the vertical and rotating position of the stacks, and it can thus search for the shortest displacement path of the stacks between two displays, without having to return between the refiling of a slide and the search for a new slide towards a start position.

The measures according to claims 3 and 4 permit on the one hand to protect the slides against dust and on the other hand to facilitate the exchange of the unit of stacks.

The measure according to claim 6 permits to extend the storage capacity by always handling two slides at once, the data processing machine selecting for display one or the other in accordance with the memorized display program.

BRIEF DESCRIPTION OF THE SINGLE DRAWING

The invention will be described hereafter in detail with reference to an example of realisation and the unique figure of the drawings which represents in a perspective and partially cut view a device according to the invention.

DESCRIPTION OF THE PREFERRED EMBODIMENT

The device is composed of three basic elements, i.e. a storage container 1 holding the slides, a projection unit 2 and a data processing machine 3 with a keyboard 4 and a screen 5.

The storage container 1 encloses a stack of racks such as 6 as well as means for controlling the displacement of the stack under the control of the data processing machine 3, so that any slide of any rack can be placed in front of a window 7 provided in the cylindrical wall 8 of the container. Each rack such as 6 comprises for example 200 places 9 for one or two slides 31 each.

On the outside of the wall 8, a platform 10 is mounted in alignment with the window 7, this platform supporting an optical projection unit 11 and a television camera 12. The platform is supplied with means for extracting the slide which are disposed inside the container 1 near the window 7. These means are constituted by an electro-magnet 13, which can be displaced in a reversible way on a rail 14, which is aligned with the window. When it is activated, this magnet can be coupled to a slide. It can be displaced along this rail 14 by means of a motor 15 which is disposed below the platform. The motor is controlled by the data processing machine 3 and can place a slide either in front of the projection unit 11 or in front of the television camera in accordance with the status of a key of the keyboard 4.

The racks such as 6 are stacked on a central column and rest on a disk 16, which is located, free in rotation, above an elevator plate 17. A reversible motor 18 is mounted on this elevator plate and acts on a crown 19 which is fixed to the disk 16. A coder 20 is further mounted on the elevator plate. It is coupled by a belt 21 to a boss 22 which is fixed to the disk. The coder delivers electrical signals to the data processing machine, thus permitting the latter to know at any moment the angular position of the disk 16 with respect to the elevator plate 17.

The elevator plate 17 is supported by a nut 23 which is screwed on a threaded shaft 24. This shaft rest through a bearing 25 on the bottom 26 of the container and can be turned by a reversible motor 27, which is mounted on this bottom.

The elevator plate 17 is guided in several vertical rails 28 which are part of the cylindrical wall 8 of the storage container, these rails cooperating with projections 29 provided on the circular edge of the elevator plate 17. Thus, the elevator plate 17 is immobile in rotation and can be displaced vertically by the motor 27. A coder 30 is fixed to the elevator plate 17 and transmits to the data processing machine 3 signals which represent the instantaneous vertical position of the elevator plate.

On the side opposite to the bottom 26, the storing container 1 is closed by a cover 32, through which the unit of stacks can be exchanged.

The functioning of the device is as follows:

During the preparation of a conference, certain slides among the 2000 slides contained in the unit of stacks have to be chosen; this choice can be carried out either on the basis of a list of contents memorized by the data processing machine and/or by making the slides appear on the screen 5 after their extraction from the corresponding rack and their placing in front of the television camera 12. When the choice of slides has been made and the sequence of slides to be displayed has been memorized in the data processing machine, it is sufficient, in the course of the conference, to give orders of exchanging the slides in order to display the selected slides in the hall. For this purpose, the data processing machine searches for the store address of the next slide to be displayed and it starts the motors 18 and 27 so that the rack containing the slide in question is transferred to a position in which this slide is in front of the window 7. Then the data processing machine brings the electro-magnet 13 to this slide and extracts the latter from the rack. When the speaker calls for the next slide, the electro-magnet replaces the preceding slide into the initial rack and the data processing machine delivers the address of the subsequent slide and so on.

Several sequences can thus be memorized in the data processing machine which can even concern in part the same slides which are meant to serve for several types of conferences. The slides are never handle manually and are always placed at the same storing address.

It is obvious that this device, which has been conceived for conference halls can also serve for a decentralized presentation of slides which are registered at a central record-office. In this case, several data processing machines such as 3 are placed in several distinct places and all refer to a common storage container according to the principle of time-sharing.

I claim:

1. In a device for storing and handling slides for their selective display, comprising at least one storage rack for slides, means for displacing the racks under the control of a data processing machine so that any selected slide may appear in front of an extraction window, means for extracting the selected slide through said window towards at least one display position or vice-versa, and a projection unit in juxtaposition to said window permitting the extracted slide to be displayed on a screen, the improvement wherein there exists a plurality of circular storage racks (6) forming a unit of racks stacked according to a common vertical axis, said means for displacing the racks comprise a reversible motor (27) for vertically displacing the unit of racks (6), a cylindrical envelope encloses the unit of racks and the means for displacing the racks and the extraction window is (7) is cut out in a cylindrical wall (8) of said envelope, a motor (18) is mounted within said cylindrical envelope for rotating the unit of racks about said axis, the racks (6) rest on a disk (16), an elevator plate underlies said disk and said disk is carried by said elevator plate (17), said motor (18) driving the unit of racks into rotation is mounted on said elevator plate, a motor (27) drives a vertical threaded shaft (24) supported by a bottom (26) of the device and is engaged with a nut (23) which is immobile in rotation and which is fixed to the elevator plate (17) to effect vertical displacement of the racks and wherein the data processing machine (3) controls the extraction and the replacement of a slide (31) in accordance with the memorized sequence selected previously by the user and with the instantaneous position of the unit of racks.

2. A device according to claim 1, in which the instantaneous position of the unit of racks is transmitted to the data processing machine (3) by two coders (20, 30), one detecting the vertical position and the other detecting the angular position of the unit of racks.

3. A device according to claim 1, in which the cylindrical envelope comprises an upper cover (32) providing access to the racks (6) for charging/discharging purposes.

4. A device according to claim 1, in which there are two slide projection positions, one beside the other, one of the positions being associated to an optical projection unit (11), the other to a television camera (12), the means for extracting the selected slide being able to place this slide on command alternatively in one of said projection positions.

5. A device according to claim 1, wherein the slides (31) are arranged in the racks (6) according to two concentric circles, so that two slides are on the same radius and are extracted simultaneously, if one of them has been selected for display.

6. A device according to claim 1, in which the means for extracting the selected slide comprises an electro-magnet (13) which is linearly displayed by a reversible motor (15) mounted to said envelope, and which electro-magnet (13) is magnetically coupled to a slide to extract it from its rack through the window (7) and vice-versa.

* * * * *